Jan. 4, 1966   J. T. PINKSTON   3,227,380
QUICK CONNECTOR SPIGOT COUPLING FOR SPRAY NOZZLE
AND AERATOR ATTACHMENTS
Filed Feb. 4, 1963
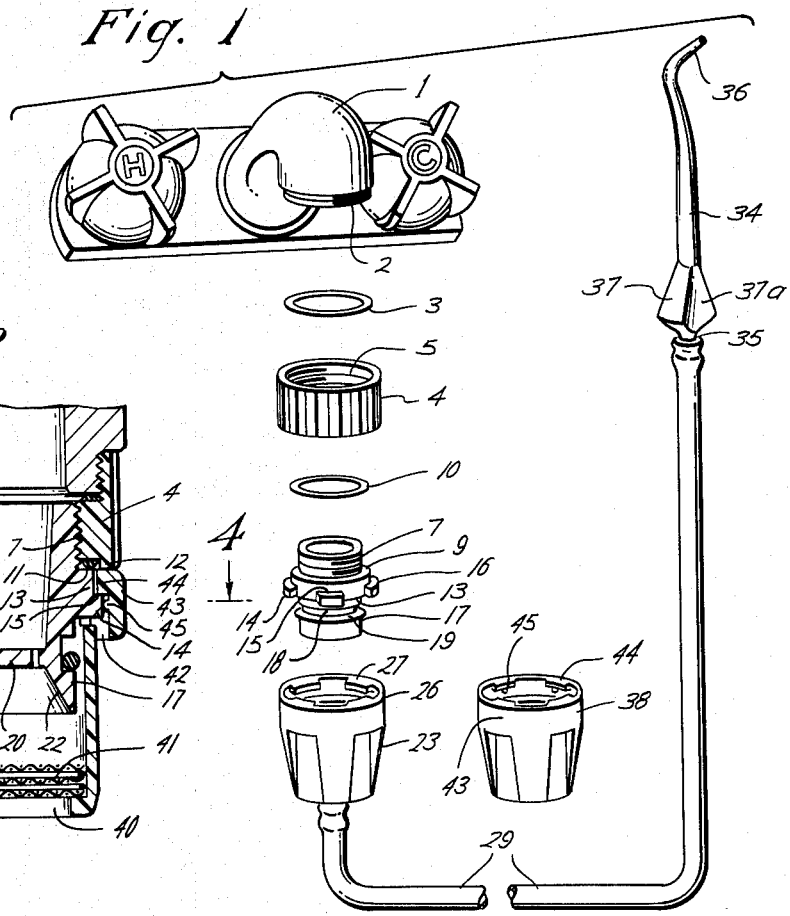
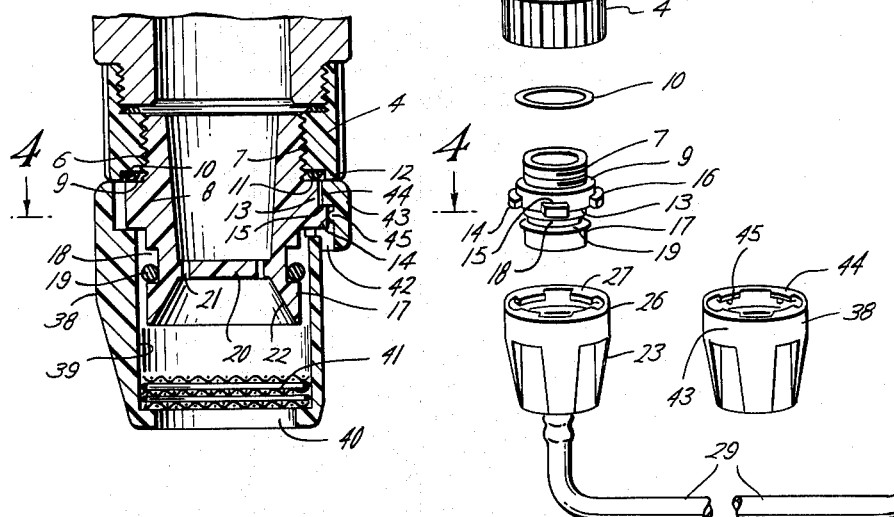
James T. Pinkston
INVENTOR.
BY Browning, Simms,
Hyer & Eickenroht
ATTORNEYS

United States Patent Office 3,227,380
Patented Jan. 4, 1966

3,227,380
QUICK CONNECTOR SPIGOT COUPLING FOR SPRAY NOZZLE AND AERATOR ATTACHMENTS
James T. Pinkston, 3 Asbury Place, Houston, Tex.
Filed Feb. 4, 1963, Ser. No. 255,925
4 Claims. (Cl. 239—427)

This invention has for its general object the provision of a quick connector spigot coupling for quickly detachably connecting a spray or the like to a spigot yet which will serve a useful purpose for retaining and forming a part of an aerator nozzle when the spray or the like is not connected thereto. It relates to a spigot or faucet coupling one part of which will be permanently or semipermanently secured to the spigot or faucet and which will then serve as a quick connector or coupling for connecting to the faucet various devices to receive a flow of liquid therefrom. Specifically, the present coupling is intended as a means of quick connection and disconnection alternatively to a spigot of a flexible conduit bearing a nozzle or the like on its opposite end and requiring a sealed connection to the spigot, or an aerator nozzle to be substantially rigidly attached to the spigot with a non-sealing connection. In connection with the aerator, the portion of the coupling permanently or semipermanently connected to the spigot will not only permit, but actually cooperate in the aerating function of the aerator nozzle.

Numerous devices for this general purpose have been proposed in the past, but have fallen short of the accomplishment of the desired ends in various respects.

Some have been permanently connected to the faucet which, of course, interferes with the usual action of the faucet inasmuch as the flexible conduit with a nozzle thereon is always connected to the faucet and in the way of operations not requiring same. Some have been connected by special connections to the faucet housing upstream from the valve of the faucet so as to leave the faucet free for normal operation but these have required special arrangements for storage of the flexible conduit and nozzle while they are still connected but not in use, and the conduit and nozzle themselves have usually required their own shutoff valve and during periods when not in use were under the normal water pressure, a thing which is undesirable for flexible conduits near a lavatory or the like.

In some instances connections have been provided having parts adapted for permanent or semipermanent attachment to a faucet and other parts adapted to be disconnected and connected thereto as required. However, these invariably left parts of the coupling member on the spigot or faucet by which the other coupling member is secured thereto exposed when the flexible conduit is removed and to a greater or lesser degree interfered with the normal use of the faucet as such. Since they required a sealed connection for use with a flexible conduit, they did not lend themselves easily to the use of an aerator nozzle substituted for the flexible conduit connection. Finally, in nearly every instance, the arrangement was such that the sealed connection between the portion of the coupling on the faucet and that on the flexible conduit was effected by a threaded joint which had to be tightened sufficiently to compress a gasket and thus provide the necessary seal. Such connections are difficult to engage and disengage and partly defeated the purpose of having a quick detachable connection.

It is therefore an object of this invention to provide a quick detachable coupling of the general character above mentioned having a portion semipermanently securable to a faucet without necessity for any special tools in connection therewith nor for the services of a skilled mechanic or plumber.

Another object is to provide such a coupling in which the part adapted to be secured to the faucet may be secured by hand to provide a tight joint and seal and at the same time protected against being overtightened by a person possessing more strength than required for the normal tightening.

Another object is to provide a coupling of the general type mentioned in which one member of the coupling is semipermanently secured to the faucet and the other to a flexible conduit, in which the two may be brought together by an axial or endwise movement and merely turned to secure the members in engagement with each other and provide a seal between them without necessity for forcefully threading or tightening them together.

Another object is to provide a seal between the members of such a coupling, which seal will provide an initial interference seal between the two members and a seal which will be subsequently rendered more effective as pressure thereagainst increases, yet which seal will not be subjected to pinching or abrasion in engagement of the members one with another.

Another object is to provide such a seal which will not offer substantial resistance to the engagement and disengagement of the members of the coupling one with the other.

Another object is to provide such a coupling member for semipermanent attachment to a spigot which is capable of receiving either a coupling member for securing a flexible conduit to the spigot with a sealed connection or an aerating nozzle for rigid connection to the spigot with a nonsealing connection.

Another object of this invention is to provide a coupling of the type referred to in which a longitudinal or axial force tending to separate the members of the joint will not have a tendency to turn them so as to disengage them from one another.

Another object is to provide an aerating nozzle for attachment to one of such coupling members with frictional means for preventing rotational motion to disengage the nozzle from the coupling member without the necessity for any seal ring engagement between them.

Other objects and advantages of this invention will become apparent from the following description taken in connection with the accompanying drawings wherein is set forth by way of illustration one embodiment of the invention.

In the drawings:

FIG. 1 is an exploded view showing the parts of this invention in perspective and in appropriate arrangement with respect to one another and with respect to a faucet for assembly with the faucet connected to a spray nozzle through a flexible conduit, and illustrating in similar fashion the aerator nozzle adapted to replace the removable portion of the coupling when the flexible conduit is not in use and on such occasions to form a rigid portion of the faucet.

FIG. 2 is a longitudinal cross section through the parts illustrated in FIG. 1 except for the aerator nozzle, the same being assembled with respect to one another and with respect to the faucet.

FIG. 3 is a view similar to the lower portion of FIG. 2 but illustrating the aerator nozzle in place on the upper portion of the coupling instead of the lower portion of the coupling connected to the flexible conduit.

FIG. 4 is a transverse cross section taken along the line 4—4 of FIG. 3.

Referring more in detail to the drawings, a typical faucet to which the invention is adapted to be secured is shown at 1 and in this instance has a male thread 2 provided by the faucet manufacturer for the attachment of an aerator nozzle to the faucet. A seal ring 3 of a suitable sealing material such as rubber or plastic or even metal in some instances is employed for sealing between the spigot and an adapter ring 4 having threads 5 of a size to engage the threads 2 on the spigot 1.

It will be understood that the different spigots have different types and sizes of threads 2 for receiving an aerator nozzle and some do not have any such threads at all. This is the primary reason for providing an adapter such as the adapter 4 for attachment to the spigot so that a standard size and design of coupling member may be mounted on any spigot desired. It will also be appreciated that the adapter ring may be provided with means for attachment to a spigot having no threads and that other types of seal than the seal ring 3 may be provided.

Whatever type of adapter is provided for connection to the spigot, such adapter will be provided with suitable threads 6, shown here as being internal threads, for receiving the externally threaded portion 7 of the quick connector coupling member 8. The coupling member 8 adjacent the lower end of the threads 7 is provided with an outwardly extending upwardly facing shoulder 9 upon which a seal ring 10 of suitable sealing material is normally carried. The lower end of the adapter 4 is also provided with a downwardly facing shoulder 11 adapted to receive this seal ring when the coupling member is threaded into the adapter. The seal ring will be confined at this point against radial outward expansion by means of a flange portion 12 of the adapter extending up around the shoulder 11 and providing a countersunk portion in the lower end of the adapter which confines and retains the seal ring 10. It has been found that without the confining portion 12 around the countersunk lower end of the adapter 4, a person of more strength than required may on occasion tighten the coupling member 8 into the adapter to such a degree as to extrude the seal ring 10 radially outwardly and destroy the seal. This is prevented by the provision of the countersunk portion with the confining rim or flange 12 about the outside of the seal ring.

Intermediate its ends the coupling member 8 is provided with a substantially cylindrical portion 13 extending downwardly from the shoulder 9 and, at a point spaced below such shoulder, it has projecting radially outwardly therefrom a plurality of circumferentially spaced retaining lugs 14 on its outer surface. The upper surfaces 15 of these lugs lie in a radial plane at right angles to the axis and preferably are without any spiral or tapered effect whatsoever. The radially outermost surfaces or edges are, however, rounded and, particularly adjacent one circumferential extremity, are of increasing radial extent in one circumferential direction so that any member surrounding these lugs and rotated relative thereto in one direction would have to provide increasing radial clearance as the rotation continued or come into frictional engagement with such outer edges. This last-mentioned feature is useful in securing an aerator nozzle to this coupling member as will presently be described.

Extending downwardly from this intermediate portion of the coupling member 8 is a reduced diameter portion constituting a stem 17. Surrounding its exterior surface and cut into the same is a seal ring groove 18 having a dimension axially of the coupling member which is much greater, preferably in a proportion of approximately two to one, than its depth or radial dimension. Located in this groove and frictionally engaging the bottom thereof is a seal ring 19 preferably in the form of an O-ring or seal ring of distortable material of normally circular cross section. This ring has a cross-sectional diameter somewhat greater than the depth of the groove so that when located in the groove it will protrude radially therefrom a distance sufficient to engage a surrounding surface and form an initial seal therewith.

Interiorly the coupling member 8 is provided with a passageway therethrough but this passageway is preferably interrupted intermediate its ends by a partition 20 having a plurality of small holes 21 therethrough so that flow can take place through the coupling member but only by flowing through the openings in the reticulated partition thus forced. Below this partition and from the partition to the end of the stem 17 the interior of the stem is flared as shown at 22 in a direction toward the end of the stem.

The coupling member 8 thus described, being adapted to be semi-permanently secured to the spigot, is intended to remain thereon at all times and to receive alternatively the coupling member for coupling a flexible conduit thereto as will now be described, or an aerator nozzle, with the connection to the coupling member for the flexible conduit being a sealed connection and the connection to the aerator nozzle being a rigid but non-sealed connection whereby the aerator nozzle and the coupling member 8 cooperate with each other to provide an aerator.

The coupling member for the flexible conduit is shown at 23 and constitutes a second quick connector coupling member. It has a bore intermediate its ends shown at 24 to receive the stem 17 and this bore is of a diameter to receive the stem and slightly compress the O-ring 19 to provide an initial interference seal with such O-ring as clearly illustrated in FIG. 2. The upper end of this bore terminates in an outwardly tapered upwardly extending portion 25, the lower end of the taper corresponding in diameter to the diameter of the bore 24 and the upper end of the taper being of such a diameter that the O-ring 19 will enter the same without substantial distortion. This arrangement makes it possible to insert the O-ring into the bore 24 both easily and without danger of damage to the O-ring due to being caught on a sharp edge at the entrance to the bore or from any other cause.

The upper end 25 of the second coupling member 23 is of a size to surround the outwardly extending lugs 14 on the coupling member 8 and to extend beyond the lugs 14 in an upward direction when the bore 24 is in sealing engagement with the O-ring 19. This upper end portion 26 has a plurality of retaining lugs which are spaced axially from the bore 24 by a distance greater than the thickness of the lugs 14, and these lugs 27 extend radially inwardly with respect to the end portion 26. They are circumferentially spaced from one another and are of a size and have such spacing between them that they will pass between the outwardly extending lugs 14 when they are in one rotary position with respect to the lugs 14 so as to permit the quick coupling member 23 to be moved axially into and out of engagement with the quick connector coupling member 8. When the quick connector coupling members 23 and 8 are in full engagement with one another as illustrated in FIG. 2 they are then rotatable relative to one another to a rotary position with the lugs 14 and 27 overlying one another so as to prevent axial movement in a direction to disengage the coupling members from one another. The lower surface of the lugs 27 which engages the upper surface 15 of the lugs 14 is, like the surface 15, disposed in a radial plane perpendicular to the axis of the coupling members so that there is no wedging or tightening effect which results from relative rotation of the coupling members in one direction nor loosening effect which results from relative rotation in the other direction. Consequently any force tending to move these coupling members longitudinally with respect to each other will not have a tendency to rotate them relative to each other so as to disengage them.

Since a force tending to separate the two coupling members 8 and 23 in a longitudinal direction will not act through the interengaging lugs to tend to cause relative rotation to disengaged position, all that is necessary to keep the coupling from being disengaged is a slight amount of friction to prevent it from accidental rotary movement. It has been found that such friction may be provided in the case of the coupling members 8 and 23 by the seal ring 19 and that this frictional engagement through the seal ring 19 is sufficient to prevent accidental rotation to disengage these members but is not sufficient to substantially interfere with intentional rotation either to engage or disengage them.

It is further to be noted that when in use the O-ring 19 will normally be forced by pressure of fluid within the coupling into the upper position within the groove 18 as shown in FIG. 2. When it is desired to disconnect the two coupling members 8 and 23 the relative rotation necessary to disconnect them may be readily accomplished because of the small degree of friction between the O-ring 19 and the respective members, but the O-ring 19 will not substantially interfere with withdrawal of the stem 17 from the bore 24 because upon initial movement of the stem 17 in a withdrawing direction, the O-ring 19 will roll upon the bottom of the groove 18 toward the lower side of the groove. By the time it has rolled into engagement with the lower side of the groove it will be substantially at the upper end of the tapered portion 25 whereupon its frictional engagement with the bore will cease. This arrangement greatly facilitates the removal of the coupling member 23 from the coupling member 8 without the frictional interference of a substantial nature due to the O-ring 19. But for the width of the groove 18 in which the O-ring 19 is disposed, and the presence of the taper 25 to a diameter releasing most if not all of the interference pressure on the O-ring, the O-ring would have to slide within the bore 24 upon removal of the stem therefrom, with substantial resulting resistance to such movement.

Upon the opposite end of the coupling member 23 from the lugs 27 this member is provided with a nipple 28 suitably externally grooved for receiving and retaining and thus forming a connection for a flexible conduit 29. This nipple 28 has a passageway 30 therethrough leading from the bore 24 so that fluid may flow from the bore 24 into the flexible conduit 29. Between the passageway 30 and the bore 24 is a shoulder 31 upwardly facing toward the interior of the bore 24, and disposed on this shoulder in radially extending directions are a plurality of ribs 32. These ribs 32 are for the purpose of supporting a tablet 33 or other body of material such as medication or the like desired to be dissolved in a stream of liquid flowing through the coupling. The ribs 32 will hold the tablet 33 off of the shoulder 31 and prevent it from blocking the smaller opening 30 from the lower end of the bore 24. It will be noted that the flared lower end portion 22 of the stem 17, the lower portion of the bore 24 below this flared portion, and the upwardly facing shoulder 31 provide a chamber which both receives and confines a body such as 33 subjecting it to the washing action of fluid passing through the coupling but preventing it from blocking the smaller opening 30 from this chamber.

On the opposite end of the flexible conductor 29 is shown a nozzle 34 which in this instance is particularly designed for use as a dental spray with a spray directing tip 36 disposed at an angle to the main body of the nozzle 34. The nozzle 34 has a nipple 35 on its end opposite the tip 36 for connection to the flexible conduit 29, and adjacent the nipple 35 is an enlarged portion 37 with a concavity 37a on one side thereof so as to permit the nozzle to be readily grasped and held against turning in the hand and at the same time to permit the holder to properly orient it by means of the concavity 37a.

It will be understood that other devices than the nozzle 34 may be employed in connection with this invention so long as they are devices intended to receive fluid or the like through a coupling of the character described.

When it is desired to remove the quick connector coupling member 23 and utilize the faucet or spigot 1 in the usual fashion, this could of course be done leaving the quick connector coupling member 8 exposed over that portion normally residing within the quick connector coupling member 23. However, this would be undesirable for several reasons, chief among them being that it would leave the quick connector coupling member 8 exposed to likely damage due to objects striking against it and the like. Also, the stream flowing therefrom would not be properly aerated nor subject to use in the normal fashion without possibly being emitted in a series of fine jets through the openings 21.

In order to provide for the protection of the quick connector coupling member 8 and at the same time for the conversion of the stream of fluid therefrom into a more desirable form and aerate the same, there is provided an aerator nozzle member 38 which is likewise a quick connector coupling member adapted to engage the quick connector coupling member 8 in much the same fashion as the quick connector coupling member 23. It likewise has its intermediate portion formed with a bore 39, but with the important difference that the bore 39 is of such size as to clear the outer surface of the seal ring 19 so as not to form a seal nor even any frictional contact therewith. The purpose of this is to permit the passage of air past the seal ring 19 to aerate the stream of fluid flowing through the nozzle connector member 38. This connector member 38 also has an opening 40 in its lower end which is somewhat smaller than the bore 39 thus providing an upwardly facing shoulder for receiving and supporting the strainers or screens 41, such as are customarily used in connection with aerator nozzles. The partition 20 with openings 21 therethrough and the tapered interior 22 of the stem therebelow serve a special function in combination with the aerator nozzle. The openings 21 direct a plurality of small streams against the screens 41 to draw air in past the O-ring 19 by injection and then these streams are broken up against the screens 41 and aerated. The interior taper has been found to effectively counteract tendency for the fluid to flow up and out past the O-ring 19.

In the molding of the member 38 it may be provided with openings 42 from its exterior to its interior adjacent the upper end thereof through which air may be drawn, which air may pass inwardly and down past the O-ring into the stream of fluid flowing through the nozzle. The openings 42 however are not functionally necessary inasmuch as the upper end portion 43 of this nozzle coupling member fits fairly loosely about the lugs 14 on the coupling member 8 leaving sufficient space between such lugs and within the upper end portion 43 so that air can readily pass downwardly through the upper end portion between such lugs for aeration purposes. Primarily these openings 42, and similar openings in member 23, are formed incident to molding in which core supports extend upwardly therethrough and provide supports for the lower surfaces of the lugs 44 and 27 during molding.

As in the connection between the coupling member 23 and the coupling member 8, the coupling member nozzle 38 has inwardly extending lugs 44 adjacent its upper end and spaced from the bore 39 by a distance greater than the thickness of the lugs 14. These lugs 44 are likewise spaced from one another circumferentially and of a size to pass between the lugs 14 when the two members are in one rotary position relative to each other, and to be positioned above the lugs 14 so as to permit the relative rotation of the two members into a rotary position in which the members overlie one another and prevent axial displacement of the members one from the other. As in the case of the members 23 and 8, the relative rotation of the members one to the other in each direction is limited by lugs 44a extending inwardly from the outermost member so as to receive either the one circumferential extremity or the other of the lugs 14 and stop the relative rotation of the two coupling members either with the lugs overlying one another to prevent axial displacement of the coupling members one from the other, or with the lugs out of register with one another so as to permit such axial displacement.

Inasmuch as the bore 39 is not of a size to frictionally engage the O-ring 19 as does the bore 24, the O-ring 19 will not provide the frictional resistance to this engagement rotation of the two members in order to prevent the accidental displacements as it will in the case of the coupling member 23. In order to provide such frictional resistance, the interior of the upper end portion 43 of the nozzle 38 is provided with inwardly extending projections 45 positioned so as to engage the radially outermost edges of the lugs 14 when the lugs 14 and 27 overlie each other to lock the two coupling members together. It will be seen that as the two coupling members are rotated relative to one another in a direction to lock them together, the portion of the edge surface 16 of the lugs 14 which is of increasing radial extent in a circumferential direction will come into engagement with the respective projections 45 and this engagement will increase in pressure until the lugs 14 engage the stops 44a and arrest further relative rotation. The sizes of the respective parts are such that at this point the frictional engagement between the projections 45 and the outer edge portions of the lugs 14 will be sufficient to prevent the backward rotation of the coupling members relative to each other and yet not sufficient to offer excessive resistance to rotation either in an uncoupling direction or in a coupling direction before engagement of the lugs 14 with the stops 44a. It is further noted that inasmuch as this engagement is on the outer periphery of the lugs 14 and the pressures between the parts are radial rather than lengthways of the axis, forces tending to separate the coupling members in an axial direction will still not tend to cause relative rotation of the parts in a direction to disengage them.

With the nozzle coupling member 38 in place as shown in FIG. 3, the coupling member 8 will be completely protected from damage by blows from the outside and the like, the nozzle member will be rigidly connected to the faucet or spigot, the stream flowing from the faucet will be well controlled and aerated as would be expected of a stream coming from an aerator on a faucet, and the faucet may be treated in all respects as one with merely an aerator thereon and its use is nowise impaired but actually enhanced by the presence of the quick connector coupling member 8 which makes possible the use of the aerator and the quick detachment thereof and substitution of the flexibly connected nozzle 34 at any time desired.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A coupling unit for attaching to a spigot comprising a quick connector coupling member having means to secure it to a spigot at one end, said coupling member having a plurality of circumferentially spaced radially outwardly extending retaining lugs on its outer surface on a part intermediate its ends, a stem having a passageway therethrough projecting from said intermediate part in a direction opposite from said one end, a second quick connector coupling member having an internal bore of a diameter to receive and encompass said stem, said second member having one end portion of a size to surround said outwardly extending lugs and so positioned with respect to said bore as to extend around and substantially beyond said outwardly extending lugs when said bore is in surrounding relationship to said stem, a plurality of retaining lugs spaced axially from said bore by a distance greater than the thickness of said first-mentioned lugs and extending radially inwardly from said last-mentioned end portion, said inwardly extending lugs being circumferentially spaced from one another and of a size to pass between said outwardly extending lugs when in one relative rotary position to permit said quick connector coupling members to be moved axially into and out of engagement with one another and relatively rotatable when in full engagement with one another to another rotary position with said lugs interengaging along axially mutually opposed surfaces to prevent such axial movement, the mutually opposed surfaces being flat and each lying in a single plane normal to the axis of its respective member, to hold said members as closely engaged with one another at the beginning of rotation toward said other position as when more fully rotated toward said other position, cooperating stop means on such members to limit such rotation toward said other position, said members having parts thereon mutually frictionally engaging one another in a direction directly toward and away from their axis when said lugs are in said other position to frictionally resist rotation away from said other position, said parts becoming frictionally engaged and disengaged responsive solely to manipulation of one of said members, said bore having an opening at its end opposite said one end.

2. A coupling unit for attaching to a spigot comprising a quick connector coupling member having means to secure it to a spigot at one end, said coupling member having a plurality of circumferentially spaced radially outwardly extending retaining lugs on its outer surface on a part intermediate its ends, a stem having a passageway therethrough projecting from said intermediate part in a direction opposite from said one end, a seal ring groove in the outer surface of said stem intermediate its ends adapted to receive an O-ring, said groove having a smooth bottom surface uninterrupted throughout the width of the groove and of a depth less than its dimension parallel to the axis of the coupling, an O-ring seal in said groove resiliently engaging the bottom of the groove and of a dimension to extend radially beyond the confines of said groove, a second quick connector coupling member having an intermediate bore of a diameter to receive said stem and slightly compress said O-ring radially to provide an initial interference seal and frictional engagement therewith in a direction directly toward and away from the axis of said second quick connector, said bore having an open end portion flared longitudinally from said diameter to a diameter to receive said O-ring without interference, said second member having one end portion of a size to surround said outwardly extending lugs and so positioned with respect to said bore as to extend around and substantially beyond said outwardly extending lugs when said bore is in sealing interference with said O-ring, a plurality of retaining lugs spaced axially from said bore by a distance greater than the thickness of said first-mentioned lugs and extending radially inwardly from said last-mentioned end portion, said inwardly extending lugs being circumferentially spaced from one another and of a size to pass between said outwardly extending lugs when in one relative rotary position to permit said quick connector coupling members to be moved axially into and out of engagement with one another and relatively rotatable when in full engagement with one another to another rotary position with said lugs interengaging to prevent such axial movement, the surfaces of said lugs so interengaging being disposed to hold said members as closely engaged with one another at the beginning of rotation toward said other position as when more fully rotated toward said other position, cooperating stop means on such members to limit such rotation toward said other position, and means on the end of said second member opposite said one end for connecting a conduit thereto.

3. A coupling unit for attaching to a spigot comprising a quick connector coupling member having means to secure it to a spigot at one end, a plurality of circumferentially spaced radially outwardly extending retaining lugs on the outer surface on a part of said member intermediate its ends, said lugs having their outer edges rounded and in part of increasing radial extent in the same circumferential direction, a stem having a passageway therethrough projecting from said intermediate part in a direction opposite from said one end, a second quick connector coupling member having an internal bore of a diameter to receive said stem and clear the outer extremity of said stem to provide an air flow space therebetween, an end portion of a size to surround said outwardly extending lugs and so positioned with respect to said bore as to extend around and substantially beyond said outwardly extending lugs when said bore is in surrounding relation to said stem, a plurality of retaining lugs spaced axially from said bore by a distance greater than the thickness of said first lugs extending radially inwardly from said last-mentioned end portion, said inwardly extending lugs being circumferentially spaced from one another and of a size to pass between said outwardly extending lugs when in one relative rotary position to permit said quick connector coupling members to be moved axially into and out of engagement with one another and relatively rotatable when in full engagement with one another to another rotary position with said lugs interengaging to prevent such axial movement, cooperating stop means on such members to limit such rotation toward said other position, the interengaging surfaces preventing such axial movement being flat and also being substantially normal to the axis of said coupling members when engaged so that axial force will not tend to cause relative rotation of said members, and inward projections on said second member extending inwardly therefrom opposite the positions occupied by said outwardly extending lugs when said members are in full engagement with one another and in a rotary position to prevent them from being axially displaced from one another, said projections frictionally engaging the parts of increasing radial extent of said outwardly extending lugs when said members are fully engaged and in the course of being rotated toward said other position, said projections becoming frictionally engaged and disengaged responsive solely to manipulation of one of said members.

4. A coupling unit for attaching to a spigot as set forth in claim 7, in which said stem has a partition across its passageway spaced from its end with a plurality of openings therein for breaking up flow therethrough into a plurality of fine streams and is flared from said partition to its end and said second coupling member has a screen disposed transversely of its interior.

References Cited by the Examiner

UNITED STATES PATENTS

| 797,796 | 8/1905 | Devlin | 285—113 |
|---|---|---|---|
| 1,253,309 | 1/1918 | Ulleland | 285—8 |
| 1,259,684 | 3/1918 | Vinten | 285—360 |
| 1,525,794 | 2/1925 | Blake | 285—8 |
| 1,940,210 | 12/1933 | Frederick | 128—229 |
| 1,987,907 | 1/1935 | Jenkins | 128—297 |
| 2,476,172 | 7/1949 | Williams | 285—33 |
| 2,587,784 | 3/1952 | Story | 128—229 |
| 2,702,201 | 2/1955 | Romanelli et al. | 285—8 |
| 2,738,992 | 3/1956 | Heisler | 285—374 X |
| 2,849,256 | 8/1958 | Kowal | 128—229 X |
| 2,855,930 | 10/1958 | Blankfield | 128—229 |
| 2,979,056 | 4/1961 | Wiseman | 128—278 |
| 3,051,510 | 8/1962 | Dawes | 285—374 X |

FOREIGN PATENTS

| 375,855 | 5/1907 | France. |
|---|---|---|
| 800,069 | 4/1936 | France. |
| 1,229,473 | 3/1960 | France. |
| 1,022,859 | 1/1958 | Germany. |

RICHARD A. GAUDET, *Primary Examiner.*

RENE D. TEGTMEYER, DANIEL S. BURKS, R. L. FINKS, *Assistant Examiners.*